United States Patent Office

Re. 24,919

Reissued Jan. 3, 1961

24,919

STARCH ETHERS

Hans Wolff, Decatur, Ill., assignor to A. E. Staley Manufacturing Company, Decatur, Ill., a corporation of Delaware No Drawing. Original No. 2,923,707, dated Feb. 2, 1960, Ser. No. 744,296, June 24, 1958. Application for reissue July 20, 1960, Ser. No. 44,238

6 Claims. (Cl. 260—233.3)

Matter enclosed in heavy brackets [ ] appears in the original patent but forms no part of this reissue specification; matter printed in italics indicates the additions made by reissue.

This invention relates broadly to new starch ethers and a general method for the preparation thereof. More particularly, it relates to beta hydroxy alkyl ethers of starch containing at least one long chain of carbon atoms.

An important object of the invention is the provision of new higher alkyl ethers of starch possessing useful water paste properties associated with the introduction of a limited proportion of long chain alkyl groups into the starch molecule.

Another object of the invention is to provide new starch ethers whose water pastes are superior sizes for textiles and paper.

A further object of the invention is to provide a new and improved process for the preparation of starch higher alkyl ethers. Additional objects will become apparent from the following description of the invention.

The foregoing objects are achieved according to this invention by interacting an aqueous starch paste with an appropriate epoxy compound in the presence of an acidic catalyst. The resulting product, consisting of a beta hydroxy higher alkyl ether of starch in paste form, may be used as such, or it may be dried and later reconstituted with water.

It is known that fatty groups (i.e., long chain or higher alkyl groups) can be attached to the starch molecule by conventional esterification with acid halides and anhydrides, also by conventional etherification with alkyl halides. It is also known that the ability of the starch derivatives thus obtained to swell and paste in water, as well as the flow properties of the paste, vary with the degree of derivatization.

Low substitution fatty esters and ethers of starch are superior to the parent starch in a number of commercial applications. Chief among these are the sizing of textiles and paper, using aqueous pastes of the starch derivative. Apparently, the introduction of a small proportion of long chain alkyl groups into the starch molecule increases the flexibility of dried starch paste film.

The conventional methods of preparing starch higher alkyl ethers and esters possess several disadvantages. The chief one is the necessity of using a high proportion of catalyst, generally alkaline, which either contaminates the final product or is difficult and expensive to remove.

The method and product of this invention possess the following advantages over prior art:

(1) Contamination of the product with catalyst is greatly reduced.

(2) The reaction is faster, thus reducing the reaction time for a given degree of derivatization.

(3) The product, a beta hydroxy alkyl ether of starch, has superior pasting and paste properties due to the presence of the betal hydroxyl group.

The reaction of starch with alkylene oxides to yield beta hydroxy ethers is described in U.S. Patents 1,863,208, 2,516,632, 2,516,633, 2,516,634, 2,732,309, 2,733,238 and in German Patent 368,413. None of these patents, however, disclose specifically or suggest the reaction of starch with the class of epoxides used in this invention, or disclose or suggest the improved properties of the new starch ethers thus obtained.

Starches generally can be usefully modified by the method of this invention. The starch may be native or modified according to the known commercial methods. It may be waxy (i.e., consisting chiefly of amylopectin) or non-waxy (i.e., containing a substantial proportion of amylose). It may be derived from the root, stem, or seed of a plant.

Examples of native starches to which the invention is applicable are: corn, wheat, rice, tapioca, potato, sorghum, waxy corn, and waxy sorghum.

Among the classes of modified starches which can be usefully further modified by the method of this invention are, for example, acid-treated thin boiling starches, oxidized starches, dextrins, and enzyme-modified starches.

The invention is applicable also to those starch derivatives which are capable of being pasted in water. This includes, for example, all low-substituted products obtained by reacting starch with mono-functional reagents. Among these are acylated starches such as starch acetate, the lower alkyl ethers such as methyl and ethyl starches, and the beta hydroxy lower alkyl ethers obtained by reacting starch with a lower alkylene oxide such as ethylene or propylene oxide.

Introduction of the essential long chain alkyl group into the starch molecule can be accomplished by the use of any reactive epoxide or epoxy compound containing the required alkyl group. Epoxidized glycerides and epoxidized esters of fatty acids and monohydric alcohols are preferred because of their availability and moderate cost. The following classes of epoxy compounds may also be used: free fatty acids, fatty acid amides, higher alcohols, and higher aliphatic hydrocarbons.

The epoxy compound may contain more than one epoxide ring per molecule, as, for example, in epoxidized glycerides.

To obtain the benefits of this invention, it is necessary that the epoxy compound or reagent contain at least one aliphatic chain of not less than twelve carbon atoms. No definite upper limit on the number of carbon atoms in the chain, or chains, has been found. Any of the naturally occurring unsaturated glycerides, or their constituent unsaturated acids of requisite chain length, may be epoxidized by known methods and satisfactorily used in this invention. The amides of the unsaturated higher fatty acids, preferably derived from lower amides, and lower monohydric alcohol esters of the same acids may also be epoxidized and used in the invention.

An unexpected feature of the invention is the need for an acidic catalyst to promote the reaction between starch and epoxy compound, and the pronounced ineffectiveness of alkaline catalysts. As is known, alkaline instead of acid catalysts are required to obtain commercially useful rates of reaction between starch and the lower alkylene oxides.

Both weak and strong acids are effective catalysts. Among those tested and found satisfactory are acetic, boric, sulfuric, and hydrochloric. Acidity, as measured on the pH scale, can be as low as pH 6 and as high as pH 1. Acidity higher than that indicated by pH will effectively catalyze the reaction between starch and fatty epoxide compound, but has the disadvantage of promoting also an undesired hydrolysis of the starch.

To carry out the process of this invention and obtain the new starch ethers, it is necessary that the starch be in the form of an aqueous paste wherein the starch granules or particles are at least greatly swollen with water, i.e., highly hydrated.

Reaction time and temperature required to yield the desired products are interdependent. Reaction rate is greater at 75–100° C., where most of the native starches paste in water, than at room temperatures of 20–40° C. Using methyl epoxy-stearate, for example, the desired degree of reaction can be obtained with corn starch in one-half hour at 90° C. or in five hours at 60° C.

The new starch ethers of this invention are limited to those containing a maximum of about 15%, based on the moisture-free weight of starch ether, of substituent ether group. Thus if the epoxy compound employed is methyl epoxy-stearate, the maximum substitution amounts to an average of about one hydroxylated methyl carboxyl stearyl group ($CH_3OCOC_{17}H_{34}\cdot OH$) per eleven anhydroglucose units.

The starch concentration in the paste to be reacted with the epoxy compound may be varied over wide limits. Preferably, however, the concentration is kept as high as possible consistent with subsequent processing or use of the reaction paste.

The following specific examples are preferred embodiments of the invention:

EXAMPLE 1

A slurry of 50 grams of corn starch (10% moisture) in 500 grams of water containing 2.5 grams of boric acid was heated with stirring to 80° C. and held at that temperature with continued stirring for ten minutes to paste the starch. Five grams of methyl epoxy-stearate was then added dropwise over a period of five minutes to the well-stirred paste, still at 80° C. Stirring was continued for two hours at 80° C. The epoxy compound was quickly distributed uniformly throughout the paste and then disappeared except for a slightly increased cloudiness in the paste. The viscosity of the hot paste did not change noticeably during the reaction period.

Immediately after the two hour reaction period, the hot paste was dried at low temperature in thin layers in a vacuum oven. The friable dry product thus obtained, after being ground to pass through a 100 mesh sieve, quickly formed a paste with ten parts of hot water having about the same viscosity as the original paste.

A sample of the finely ground dried reaction product was exhaustively extracted with petroleum ether in a Soxhlet extractor. The weight of extracted material, corrected for the extractable material in a control unreacted dried starch paste, was 2.0 grams, showing that 3.0 grams of the methyl epoxy-stearate had reacted to yield the beta hydroxy methyl carboxy stearyl ether of starch.

Comparative laboratory tests showed that a dilute paste of the reaction product was superior to a dilute paste of the parent corn starch, at the same concentration, as a size for cotton warp.

EXAMPLE 2

The procedure of Example 1 was repeated except for replacing the 5 grams of methyl epoxy-stearate with 10 grams of epoxidized soybean oil having an oxirane oxygen content of 6.4%. The amount of soybean oil introduced into the starch molecule as an ether moiety, calculated as the difference between 10 grams added to the reaction paste and 4 grams extracted from the reaction product was 6 grams or about 12% of the dry reaction product.

EXAMPLE 3

The procedure of Example 1 was repeated except for replacing the 2.5 grams of boric acid with one gram of glacial acetic acid. The weight of methyl carboxy stearyl group introduced was 2.4 grams or 5% of the weight of the dried reaction product.

EXAMPLE 4

The procedure of Example 1 was repeated except for replacing the boric acid (2.5 grams) with sulfuric acid (0.15 gram). The weight of methyl carboxyl stearyl group introduced was 1.4 grams or 3% of the weight of the dried reaction product.

EXAMPLE 5

The procedure of Example 1 was repeated except for replacing the boric acid with 0.15 gram of hydrochloric acid (4.2 grams of 36% HCl) and increasing the amount of methyl epoxy-stearate from 3 to 6 grams. The weight of methyl carboxy stearyl group introduced was 4.5 grams or 9% of the weight of the dried reaction product.

EXAMPLE 6

The procedure of Example 1 was repeated except that the corn starch was replaced with 50 grams of water soluble starch product made by thinning a corn starch paste with alpha amylase and rapidly drying the resultant paste at low temperature. The weight of methyl carboxy stearyl group introduced was 4.5 grams or 10% of the weight of the dried reaction product.

I claim:

1. A starch reaction product comprising the reaction product of an epoxide containing an aliphatic chain of at least twelve carbon atoms selected from the group consisting of epoxy fatty acids, *epoxy fatty acid esters*, epoxy fatty acid amides, and epoxy aliphatic alcohols and starch.

2. The method of preparing a starch reaction product which comprises preparing an aqueous starch paste and reacting said paste with an epoxide containing an aliphatic chain of at least twelve carbon atoms selected from the group consisting of epoxy fatty acids, *epoxy fatty acid esters*, epoxy fatty acid amides, and epoxy aliphatic alcohols in the presence of an acid catalyst.

3. A starch reaction product comprising the reaction product of epoxidized soybean oil and starch.

4. A starch reaction product comprising the reaction product of methyl epoxy-stearate and starch.

5. The method of preparing a starch reaction product which comprises preparing an aqueous starch paste and reacting said paste with epoxidized soybean oil in the presence of a boric acid catalyst.

6. The method of preparing a starch reaction product which comprises preparing an aqueous starch paste and reacting said paste with methyl epoxy-stearate in the presence of a boric acid catalyst.

References Cited in the file of this patent or the original patent

UNITED STATES PATENTS

| | | |
|---|---|---|
| 2,516,633 | Kesler et al. | July 25, 1950 |
| 2,733,238 | Kerr et al. | Jan. 31, 1956 |
| 2,802,000 | Caldwell et al. | Aug. 6, 1957 |
| 2,853,484 | Lolkema et al. | Sept. 23, 1958 |